United States Patent
Bonini et al.

(10) Patent No.: US 9,242,294 B2
(45) Date of Patent: Jan. 26, 2016

(54) METHODS OF FORMING COOLING CHANNELS USING BACKSTRIKE PROTECTION

(71) Applicant: GENERAL ELECTRIC COMPANY, Schenectady, NY (US)

(72) Inventors: Eric Richard Bonini, Greer, SC (US); Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 307 days.

(21) Appl. No.: 13/628,204

(22) Filed: Sep. 27, 2012

(65) Prior Publication Data
US 2015/0367460 A1 Dec. 24, 2015

(51) Int. Cl.
*B22D 25/02* (2006.01)
*F01D 5/18* (2006.01)

(52) U.S. Cl.
CPC ............... *B22D 25/02* (2013.01); *F01D 5/187* (2013.01); *F05D 2230/13* (2013.01); *F05D 2230/21* (2013.01); *F05D 2260/202* (2013.01); *Y10T 29/49815* (2013.01)

(58) Field of Classification Search
CPC .......... B23P 15/02; B23P 15/04; F01D 5/147; F01D 5/14; F01D 5/18; F01D 5/187; F01D 25/285; B22D 25/02
USPC ........................................................ 29/889.7
See application file for complete search history.

(56) References Cited

U.S. PATENT DOCUMENTS

| | | | |
|---|---|---|---|
| 3,730,040 A | 5/1973 | Chadwick et al. |
| 4,487,550 A | 12/1984 | Horvath et al. |
| 4,669,229 A | 6/1987 | Ehlbeck |
| 4,864,780 A | 9/1989 | Ehlbeck et al. |
| 4,893,987 A | 1/1990 | Lee et al. |
| 5,564,902 A | 10/1996 | Tomita |

(Continued)

FOREIGN PATENT DOCUMENTS

EP     1387040 B1     4/2004

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Moshe Wilensky
(74) *Attorney, Agent, or Firm* — Ann M. Agosti

(57) ABSTRACT

A method of forming cooling channels in a component is provided. The component has a substrate having outer and inner surfaces. The inner surface defines at least one interior space, and a core is disposed within each interior space. The method includes forming at least one access hole in the substrate, while the core is disposed within the respective interior space, removing the core from the respective interior space, and forming at least one groove in the outer substrate surface (before or after the core is removed). Each access hole connects the groove in fluid communication with the respective interior space. The method further includes disposing a coating over at least a portion of the outer substrate surface, where the coating includes at least a structural coating that extends over the groove(s), such that the groove(s) and the structural coating together define one or more channels configured to convey a coolant from the respective interior space(s) for cooling the component.

20 Claims, 6 Drawing Sheets

(56) References Cited

U.S. PATENT DOCUMENTS

| | | | |
|---|---|---|---|
| 5,626,462 A | 5/1997 | Jackson et al. | |
| 5,640,767 A | 6/1997 | Jackson et al. | |
| 5,660,523 A | 8/1997 | Lee | |
| 5,875,549 A | 3/1999 | McKinley | |
| 6,059,530 A | 5/2000 | Lee | |
| 6,086,328 A | 7/2000 | Lee | |
| 6,164,914 A | 12/2000 | Correia et al. | |
| 6,190,129 B1 | 2/2001 | Mayer et al. | |
| 6,214,248 B1 | 4/2001 | Browning et al. | |
| 6,231,307 B1 | 5/2001 | Correia | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |
| 6,383,602 B1 | 5/2002 | Fric et al. | |
| 6,405,435 B1 | 6/2002 | Konter et al. | |
| 6,412,541 B2 | 7/2002 | Roesler et al. | |
| 6,427,327 B1 | 8/2002 | Bunker | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,617,003 B1 | 9/2003 | Lee et al. | |
| 6,905,302 B2 | 6/2005 | Lee et al. | |
| 6,921,014 B2 | 7/2005 | Hasz et al. | |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,216,428 B2 | 5/2007 | Memmen et al. | |
| 7,302,990 B2 | 12/2007 | Bunker et al. | |
| 7,744,348 B2 | 6/2010 | Bezencon et al. | |
| 7,766,617 B1 | 8/2010 | Liang | |
| 7,775,768 B2 | 8/2010 | Devore et al. | |
| 7,946,335 B2* | 5/2011 | Bewlay et al. | 164/519 |
| 8,147,196 B2 | 4/2012 | Campbell et al. | |
| 2002/0141868 A1 | 10/2002 | Lee et al. | |
| 2002/0141869 A1 | 10/2002 | Lee et al. | |
| 2002/0182074 A1 | 12/2002 | Bunker | |
| 2002/0197160 A1 | 12/2002 | Liang | |
| 2003/0118444 A1 | 6/2003 | Lee et al. | |
| 2004/0096328 A1 | 5/2004 | Soechting et al. | |
| 2006/0153680 A1 | 7/2006 | Liang | |
| 2010/0080688 A1 | 4/2010 | Bezencon et al. | |
| 2011/0023301 A1* | 2/2011 | Jones | 29/889.71 |
| 2012/0163984 A1* | 6/2012 | Bunker | 416/241 B |

OTHER PUBLICATIONS

Wei et al., "Curved Electrode and Electrochemical Machining Method and Assembly Employing the Same," U.S. Appl. No. 12/562,528, filed Sep. 18, 2009.

Zhang et al., Process and System for Forming Shaped Air Holes, U.S. Appl. No. 12/697,005, filed Jan. 29, 2010.

Lacy et al., "Hot Gas Path Component Cooling System," U.S. Appl. No. 12/765,372, filed Apr. 22, 2010.

Lacy et a., "Articles Which Include Chevron Film Cooling Holes, and Related Processes," U.S. Appl. No. 12/790,675, filed May 28, 2010.

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bunker et al., "Components With Re-Entrant Shaped Cooling Channels and Methods of Manufacture," U.S. Appl. No. 12/943,624, filed Nov. 10, 2010.

Bunker et al., "Component and Methods of Fabricating and Coating a Component," U.S. Appl. No. 12/943,646, filed Nov. 10, 2010.

Bunker et al., "Method of Fabricating a Component Using a Fugitive Coating," U.S. Appl. No. 12/943,563, filed Nov. 10, 2010.

Bunker et al., "Components With Cooling Channels and Methods of Manufacture," U.S. Appl. No. 12/965,083, filed Dec. 10, 2010.

Bunker et al., "Method of Fabricating a Component Using a Two-Layer Structural Coating," U.S. Appl. No. 12/996,101, filed Dec. 13, 2010.

Bunker et al., "Turbine Components With Cooling Features and Methods of Manufacturing the Same," U.S. Appl. No. 12/953,177, filed Nov. 23, 2010.

Bunker, "Components With Cooling Channels and Methods of Manufacture," U.S. Appl. No. 13/026,595, filed Feb. 14, 2011.

Rebak et al., "Methods of Fabricating a Coated Component Using Multiple Types of Fillers," U.S. Appl. No. 13/083,701, filed Apr. 11, 2011.

Bunker et al., "Components With Cooling Channels Formed in Coating and Methods of Manufacture", U.S. Appl. No. 13/052,415, filed Mar. 21, 2011.

Rebak et al., "Component and Methods of Fabricating a Coated Component Using Multiple Types of Fillers," U.S. Appl. No. 13/095,129, filed Apr. 27, 2011.

Bunker, "Components With Cooling Channels and Methods of Manufacture", U.S. Appl. No. 13/168,144, filed Jun. 24, 2011.

Bunker et al., "Components With Cooling Channels and Methods of Manufacture", U.S. Appl. No. 13/210,697, filed Aug. 16, 2011.

Bunker, "Repair Methods for Cooled Components", U.S. Appl. No. 13/267,617, filed Oct. 6, 2011.

Bunker et al., Components With Laser Cladding and Methods of Manufacture, U.S. Appl. No. 13/278,816, filed Oct. 21, 2011.

Bunker, "Components With Microchannel Cooling", U.S. Appl. No. 13/326,540, filed Dec. 15, 2011.

Bunker, "Components With Microchannel Cooling", U.S. Appl. No. 13/448,469, filed Apr. 17, 2012.

Bunker, "Components With Microchannel Cooled Platforms and Fillets and Methods of Manufacture", U.S. Appl. No. 13/478,517, filed May 23, 2012.

Bunker et al., "Components With Cooling Channels and Methods of Manufacture", U.S. Appl. No. 13/595,120, filed Aug. 27, 2012.

Bancheri et al., "Method for Removal of Cores From Niobium-Based Part" U.S. Appl. No. 11/276,002, filed Feb. 9, 2006.

* cited by examiner

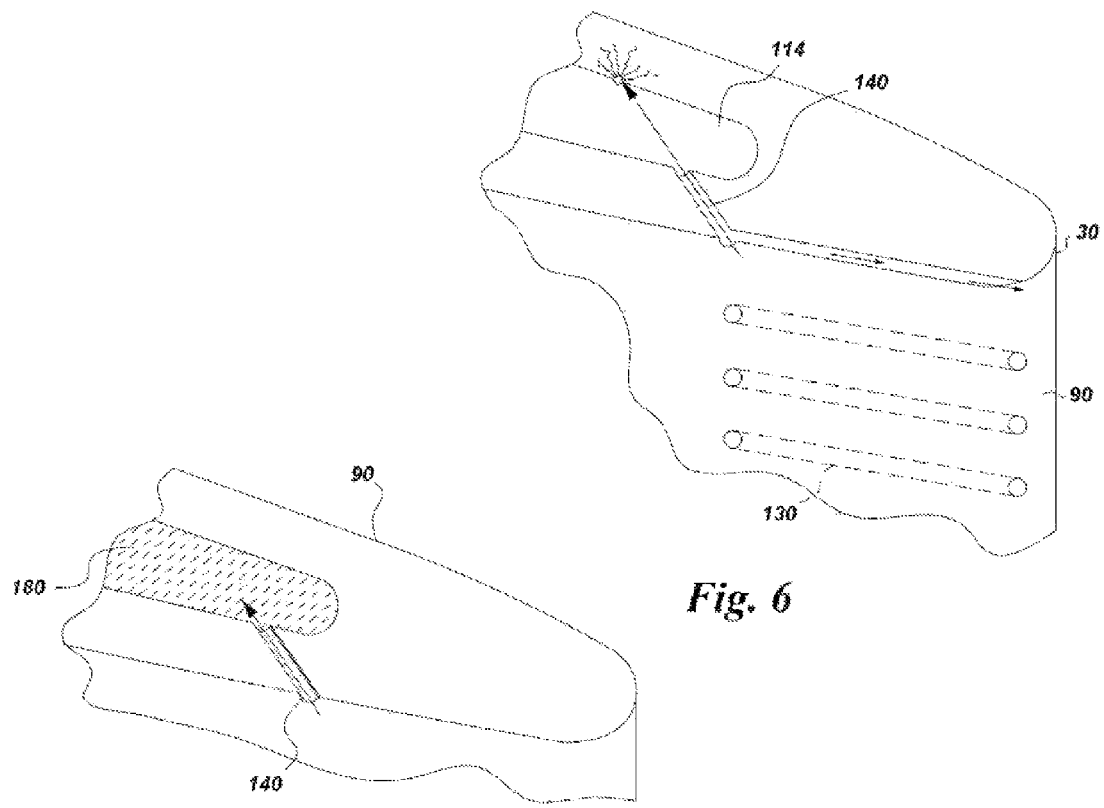
Fig. 6
Fig. 7A
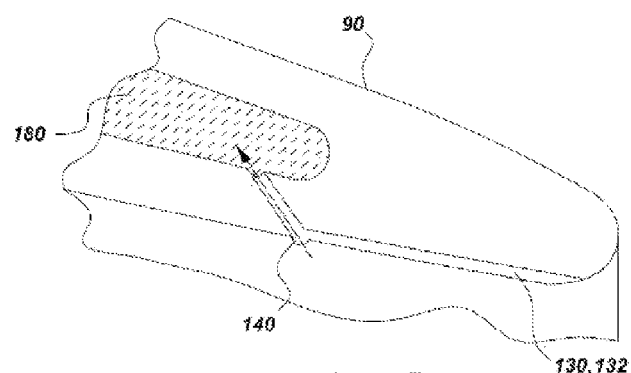
Fig. 7B

METHODS OF FORMING COOLING CHANNELS USING BACKSTRIKE PROTECTION

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively low heat transfer rates and non-uniform component temperature profiles.

Recently, micro channel cooling has been proposed as a means for improving cooling of critical areas on hot-gas path components. See for example, US Patent Application Publication No. 20120111545 A1, Ronald Scott Bunker et al., "Components with re-entrant shaped cooling channels and methods of manufacture," which is hereby incorporated by reference herein in its entirety.

Access holes are used to supply micro-channels with coolant from interior spaces within the component. However, FIG. 6 of the present application illustrates a problem associated with forming the access holes. Namely, when abrasive liquid jet (ALJ) drilling is used to make access (coolant supply) holes into the interior cavities 114, once all the ALJ punches through the wall and defines the access hole, the ALJ can also strike the interior surface of the opposite wall, thereby damaging that surface.

It would therefore be desirable to provide an improved process for forming micro-channel cooled components that would prevent or reduce damage to these surfaces during the formation of the access holes used to supply the micro-channels with coolant from the interior of the component.

BRIEF DESCRIPTION

One aspect of the present invention resides in a method of forming cooling channels in a component that includes a substrate having an outer surface and an inner surface, where the inner surface defines at least one interior space, and a core is disposed within each interior space. The method includes forming at least one access hole in the substrate, while the core is disposed within the respective interior space, removing the core from the respective interior space, and forming at least one groove in the outer surface of the substrate (before or after the core is removed). Each access hole connects the respective groove in fluid communication with the respective interior space. The method further includes disposing a coating over at least a portion of the outer surface of the substrate, where the coating include at least a structural coating that extends over the groove(s), such that the groove(s) and the structural coating together define one or more channels configured to convey a coolant from the respective interior space(s) for cooling the component.

Another aspect of the present invention resides in a method of forming cooling channels in a component. The method includes casting a substrate around at least one casting core. The substrate has an outer surface and an inner surface, where the inner surface defines at least one interior space. Each casting core is disposed within each interior space. The method further includes forming at least one access hole in the substrate, while the casting core is disposed within the respective interior space, removing the casting core from the respective interior space, and forming at least one groove in the outer surface of the substrate (before or after the casting core is removed). Each access hole connects the groove in fluid communication with the respective interior space. The method further includes disposing a coating over at least a portion of the outer surface of the substrate, where the coating includes at least a structural coating that extends over the groove(s), such that the groove(s) and the structural coating together define one or more channels configured to convey a coolant from the respective interior space(s) for cooling the component.

Yet another aspect of the present invention resides in a method of forming cooling channels in a component. The method includes casting a substrate using at least one casting core. The substrate has an outer surface and an inner surface, where the inner surface defines at least one interior space. The method further includes removing the casting core(s) from the respective interior space(s), at least partially filling the interior space(s) with a slurry, at least partially curing the slurry to form a subsequently formed core, and forming at least one access hole in the substrate, while the subsequently formed core is disposed within the respective interior space. The subsequently formed core need not have the same chemistry or properties (density, hardness) as the original casting core. Each access hole connects the groove in fluid communication with the respective interior space. The method further includes removing the subsequently formed core from the respective interior space, and forming at least one groove in the outer surface of the substrate (before or after the subsequently formed core is removed). Each access hole connects the respective groove in fluid communication with the respective interior space. The method further includes disposing a coating over at least a portion of the outer surface of the substrate. The cooling includes at least a structural coating that extends over the groove(s), such that groove(s) and the structural coating together define one or more channels configured to convey a coolant from the respective interior space(s) for cooling the component.

DRAWINGS

These and other features, aspects, and advantages of the present invention will become better understood when the following detailed description is read with reference to the accompanying drawings in which like characters represent like parts throughout the drawings, wherein:

FIG. 6 illustrates a problem associated with forming access holes to supply micro-channels with coolant from the interior space of the component;

FIG. 7A illustrates the use of a ceramic casting core to prevent back-strike when forming the access hole(s) to supply micro-channels with coolant from an interior space and prior to fabrication of grooves;

FIG. 7B illustrates the use of a ceramic casting core to prevent back-strike when forming the access hole(s) to supply micro-channels with coolant from an interior space and subsequent to fabrication of grooves;

Figure 8:
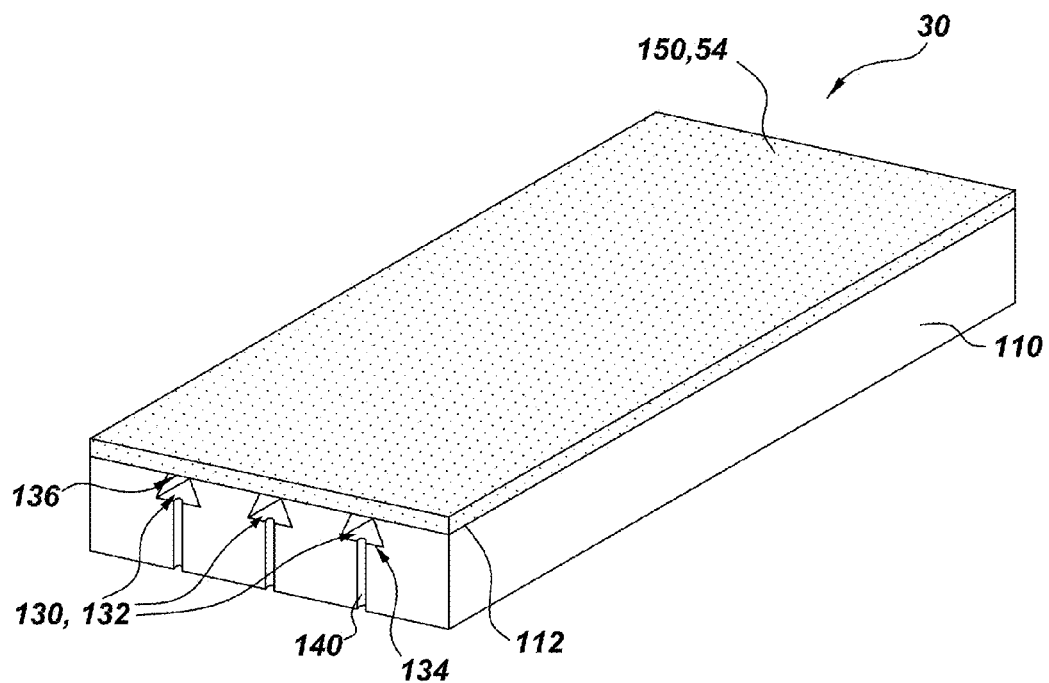
Figure 9:
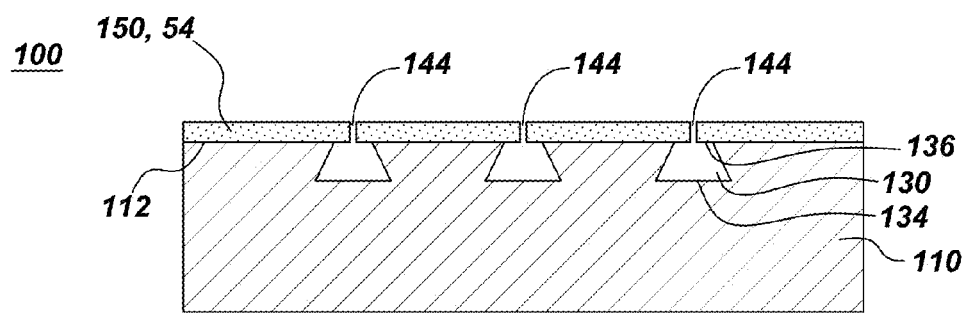
Figure 10:
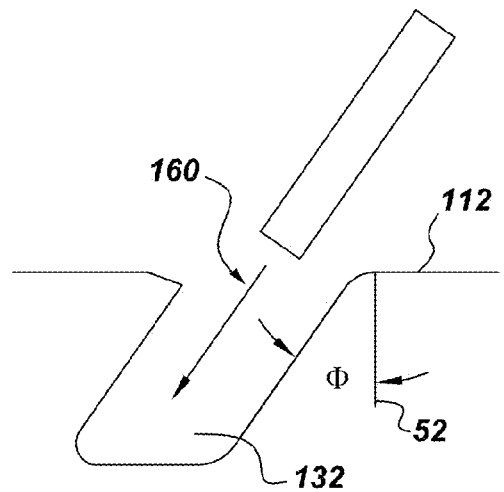
Figure 11:
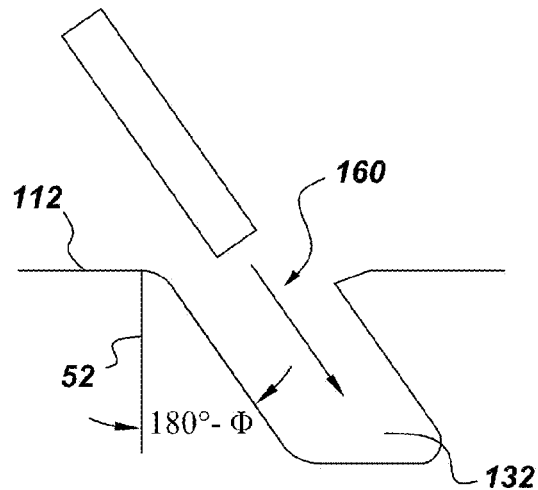
Figure 12:
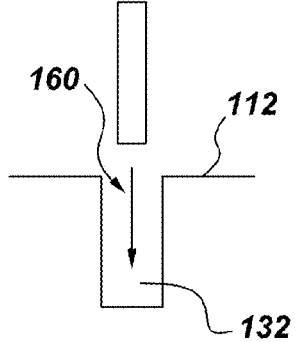

FIG. 8 schematically depicts, in perspective view, three exemplary micro-channels that extend partially along the surface of the substrate and convey coolant to the trailing edge of the airfoil;

FIG. 9 is a cross-sectional view of three exemplary reentrant shaped channels, where porous slots extend through a structural coating;

FIG. 10 illustrates a first pass of an abrasive liquid jet at an angle Φ for forming a re-entrant groove;

FIG. 11 illustrates a second pass of the abrasive liquid jet at an opposite angle 180-Φ for forming the re-entrant groove; and FIG. 12 illustrates an optional third pass of the abrasive liquid jet normal to the groove, for forming the re-entrant groove.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described invention features may be combined in any suitable manner in the various embodiments and configurations.

Figure 1:
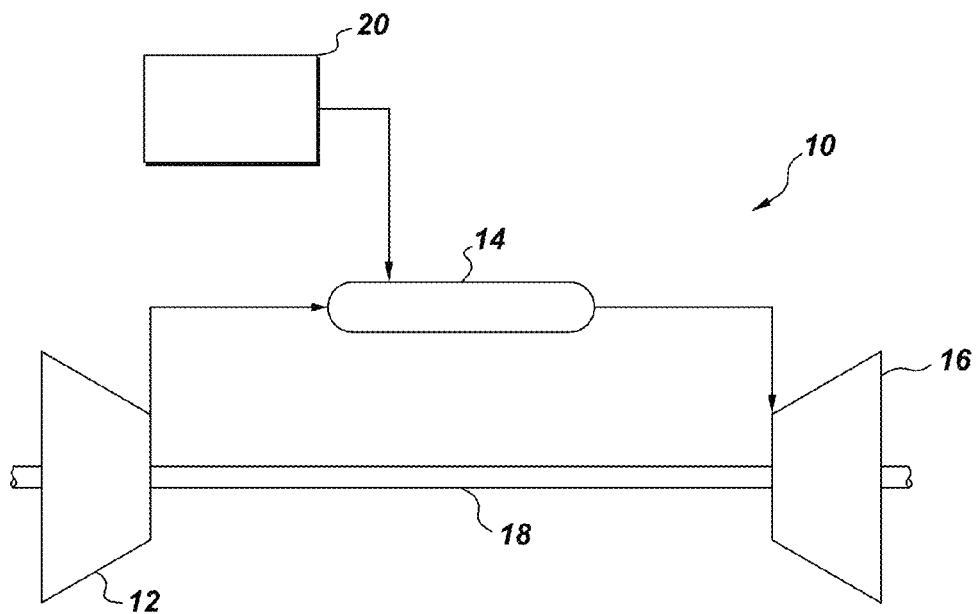
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shafts 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component 100 of the present invention is not limited to the above examples, but may be any component that is at least partially exposed to a flow of high temperature gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, as required to achieve the desired efficiency, performance and/or life of the system 10, a cooling system for the hot gas path component 100 is needed.

Micro-channel cooling has the potential to significantly reduce cooling requirements by placing the cooling as close as possible to the heated region, thus reducing the temperature difference between the hot side and cold side of the main load bearing substrate material for a given heat transfer rate.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. The hot gas path component may be provided with a protective coating. A cooling fluid may be provided to the channels from a plenum, and the cooling fluid may flow through the channels, cooling the hot gas path component.

Figure 2:
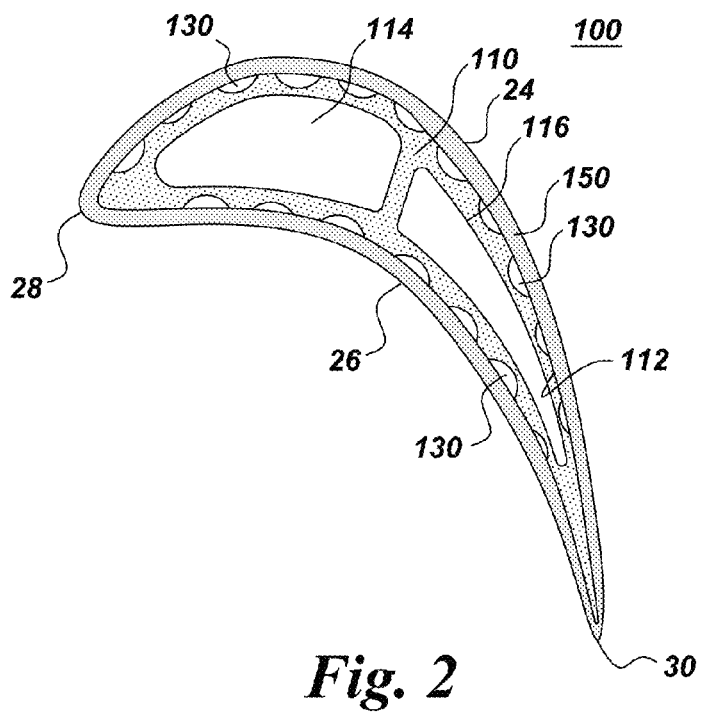
FIG. 2 is a schematic cross-section of an exemplary airfoil configuration.
Figure 3:
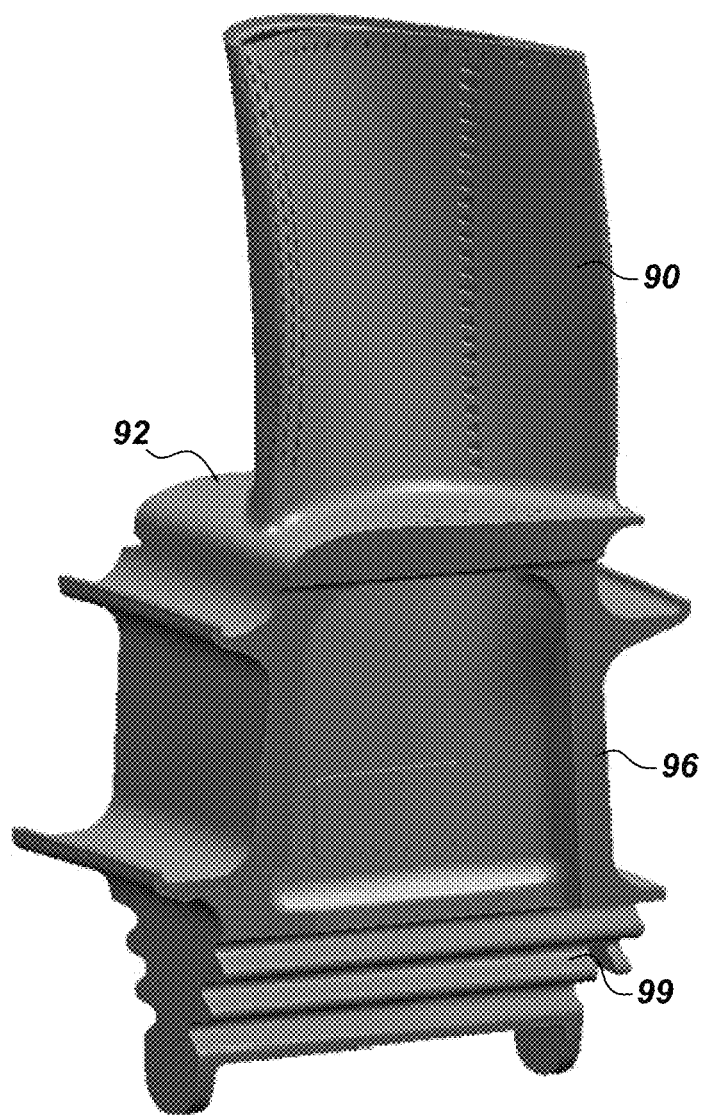
FIG. 3 shows an example hot gas path component with an airfoil, platform, shank, and dovetail.
Figure 4:
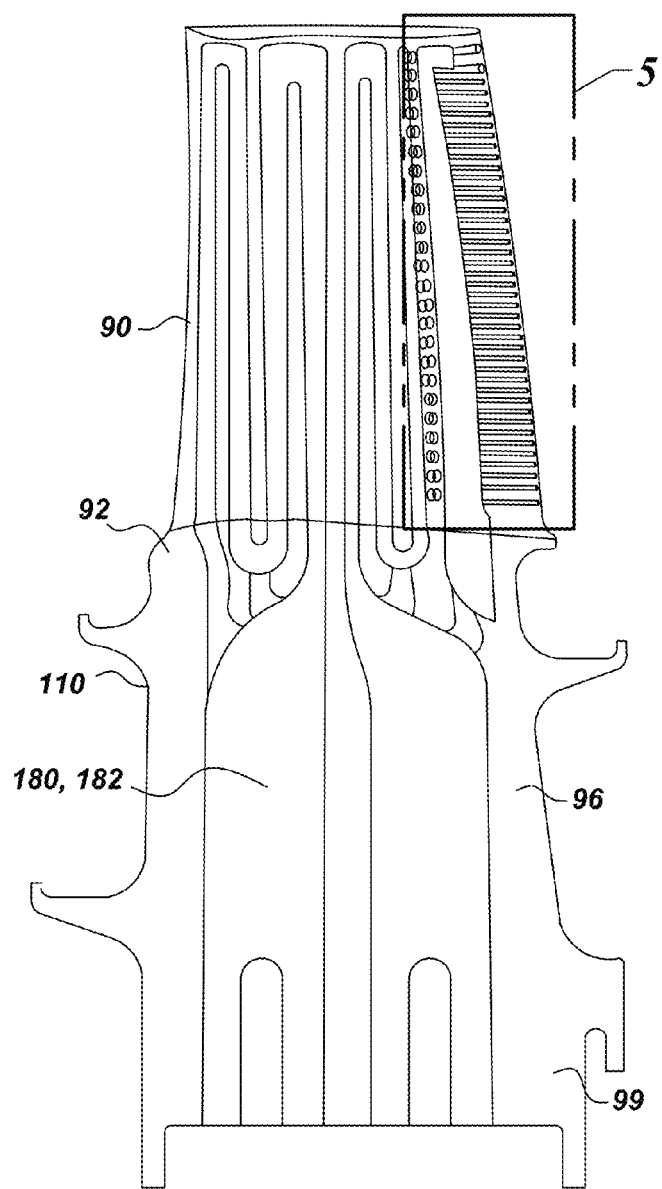
FIG. 4 is a cross-section of the hot gas path component of FIG. 3 with a core disposed within the interior spaces of the component's substrate.
Figure 5:
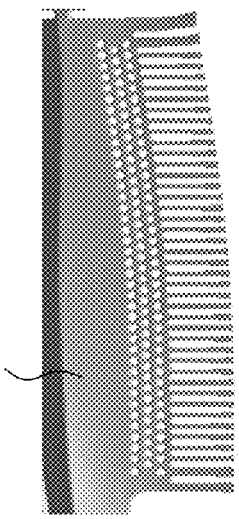
FIG. 5 shows a portion of the core of FIG. 4.

A method of forming cooling channels 130 in a component 100 is described with reference to FIGS. 2 and 4-12. As indicated, for example, in FIG. 2, the component 100 includes a substrate 110 having an outer surface 112 and an inner surface 116. As indicated for example in FIG. 2, the inner surface 116 defines at least one interior space 114. For the example arrangement shown in FIG. 2, the outer surface 112 of the substrate 110 defines a pressure side wall 24 and a suction side wall 26, where the pressure and suction side walls 24, 26 are connected together at a leading edge 28 and at a trailing edge 30 of the component 100. As shown in FIG. 2, the suction side 26 is convex-shaped and pressure side 24 is concave-shaped. As indicated in FIGS. 4, 5 and 7, a core 180 in disputed within each interior space 114. It should be noted that the core may be one integral core, or may be several cores that are connected together prior to casting the metal. Thus, the core disposed within each interior space might be one core that is connected at tip and root turn regions, for example, or several cores assembled prior to casting.

Referring now to FIGS. 7A and 7B, the method includes forming at least one access hole 140 in the substrate 110, while the core 180 (either a casting core or a subsequently formed core) is disposed within the respective interior space 114, and prior to fabrication of the one or more grooves 132 (as best illustrated in FIG. 7A) or subsequent to fabrication of the one or more grooves 132 (as best illustrated in FIG. 7B). FIG. 4 illustrates, in cross-sectional view, an exemplary hot gas path component, with a core disposed within the interior spaces of the component's substrate, and FIG. 5 shows a portion of the core of FIG. 4. As indicated in FIG. 6, for example, each access hole 140 connects the respective groove 132 (discussed below) in fluid communication with the respective interior space 114. It should be noted that the holes 140 shown in FIG. 8 are discrete holes located in the cross-section shown and do not extend through the substrate along the length of the grooves 132.

The interior access holes 140 supplying the respective grooves may be drilled either as a straight hole of constant cross section, a shaped hole (elliptical etc.), or a converging or diverging hole. Methods for forming the access holes are provided in commonly assigned U.S. patent application Ser. No. 13/210,697, Ronald S. Bunker et al., "Components with cooling channels and methods of manufacture," which is incorporated by reference herein in its entirety. For particular processes, the access hole(s) 140 may be formed using abrasive liquid jet, which is described in detail below. However, FIG. 6 illustrates a problem associated with forming access holes to supply micro-channels with coolant from the interior space of the component. Namely, when abrasive liquid jet (ALJ) drilling is used to make access (coolant supply) holes into the interior cavities 114, once the ALJ punches through the wall and defines the supply hole, the ALJ can also strike the interior surface of the opposite wall, thereby damaging that surface.

Beneficially, the use of a ceramic core when forming the access hole(s) to supply the grooves with coolant from an interior space, prevents back-strike, as illustrated in FIG. 7. In addition, this improved process takes advantage of the current processing of ceramic cores by simply leaving the core in the metal component as the backstop material to absorb and disperse the energy of the ALJ after it has penetrated the first wall. This improved process has several advantages over prior art techniques. For particular processes, the core 180 is at least partially cracked as a result of the formation of at least one access hole 140 in the substrate 110. Thus for these particular processes, the ALJ will serve to partially or completely break up the core material making it easier to leach out, especially in regions such as the trailing edge where leaching typically takes a very long time due to the restricted dimensions. In addition, the ceramic cure is a solid material made of fine particles that can spread the ALJ energy better than larger particles of a distributed medium. Also, for particular processes, the core is already present from the casting operation.

Typically, the substrate 110 is cast prior to forming the access holes. As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4,5-10.5)Al-(4.5-7.9)Cr-(1.5-5.5)Hf-(0-6)V, where the composition ranges are in atom per cent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and/or $Mo_3Si$ second phases. For other configurations, the substrate material comprises a ceramic matrix composite, such as a silicon carbide (SiC) matrix reinforced with SIC fibers. For other configurations the substrate material comprises a TiAl-based intermetallic compound.

Referring now to FIGS. 6 and 7, the method further includes removing the core 180 (FIG. 7) from the respective interior space 114 (FIG. 6). For particular configurations, the core 180 comprises a ceramic core 180. Non-limiting examples of suitable ceramic core materials include ceramic oxides, such as silica, alumina and yttria (yttrium oxide). For example, U.S. Pat. No. 4,097,292 (Huseby and Klug) describes core compositions based on various yttrium aluminates, including yttrium aluminum perovskite (YAP), yttrium aluminum garnet (YAG), and monoclinic yttrium aluminate (YAM). The compositions consist of either single phase materials of the aluminates, or two-phase mixtures thereof. As another example, U.S. Pat. No. 5,409,871 (Dodds and Alexander) describes core compositions based on yttrium aluminate and alumina ($Al_2O_3$). Moreover, U.S. Pat. No. 6,345,663 (Klug and Giddings) describes casting core precursor materials which include alumina, aluminum metal, a polymerizable binder, and various water/organic solutions. The precursor slurry can also contain various other constituents, such as colloidal silica, hafnium, yttrium aluminate, other rare earth aluminates, magnesium, and zirconium. In addition, U.S. Pat. No. 7,946,335 discloses a rare earth-based core for use in casting a reactive metal. The core contains a ceramic composition which includes at least about 10% by weight of monoclinic rare earth aluminate ($RE4Al2O9$), wherein RE represents at least one rare earth element; and at least about 10% by weight of at least one free rare earth oxide. The ceramic phase of the composition may include a microstructure which comprises a multitude of substantially spherical pores which are formed as a result of the removal of aluminum metal from the core composition during a heat treatment step.

For particular configurations, the core 180 is removed using a leaching process. Example leaching processes include a high temperature caustic solution autoclave process. As explained in U.S. Pat. No. 7,946,335, "cores containing monoclinic aluminates like YAM can be successfully removed from a casting by leaching with one or more acids." The following example process is taken from U.S. Pat. No. 7,946,335, which further explains:

Acids and acid-based treatment compositions (e.g., aqueous solutions) suitable for carrying out this process are described in U.S. patent application Ser. No. 11/276,002 (Klug et al), filed on Feb. 9, 2006, and incorporated herein by reference. Examples include hydrochloric acid, nitric acid, phosphoric acid, nitric/phosphoric acid, sulfuric acid, acetic acid, and various other combinations of the foregoing. The core is treated with an effective amount of the acid-based composition, i.e., an amount effective to remove substantially all of the core material. (Post-treatment steps can also be undertaken to remove residual core material, e.g., air-blowing, washing, and the like. The effective amount of the acid(s) will depend on a variety of factors, such as the particular composition of the core (e.g., how much $RE_4Al_2O_9$ compound is present); the acid system being used; and the type of alloy being cast, using the core. As a general guideline for some situations, the core can be treated with one or more of the following acids: about 5% to about 91% concentration nitric acid, about 2% to about 3% concentration HCl acid, about 50% to about 85% concentration phosphoric acid, about 5% to about 30% concentration sulfuric acid, and about 30% to about 90% concentration acetic acid. A factor in selecting a particular acid is its ability to dissolve the core material, while being substantially non-reactive with the material being cast, e.g., the niobium silicide. The preferred acid treatment composition often comprises nitric acid (e.g., an azeotropic mixture thereof); or a combination of nitric acid and phosphoric acid.

As noted in application Ser. No. 11/276,002, the acid treatment composition is usually heated, e.g., to its boiling temperature or slightly below that temperature, at a selected pressure. A variety of treatment techniques may be employed to dissolve the core. Most often, the casting is immersed in a bath which holds the acid composition. (The bath is often agitated).

Further, U.S. Pat. No. 4,097,292 (Huseby and Klug) discloses a technique for removing ceramic cores with compositions based on various yttrium aluminates, including yttrium aluminum perovskite (YAP), yttrium aluminum garnet (YAG), and monoclinic yttrium aluminate (YAM). In particular, the ceramic cores from may be removed from casting of advanced superalloy materials using molten salts, such as molten fluoride salts and/or molten chloride salts. Such suitable salts are $M_3AlF_6$, $M_3AlF_6+MF$, $M_3AlF_6+M'F_2$ and $M_3AlF_6+MCl$, where M is Li, Na or K and M' is Mg, Ca, Ba, or Sr. In addition, a controlled atmosphere for covering the molten salt bath may be employed using one of argon, neon, hydrogen, nitrogen and helium, and a molten chloride salt bath may be provided, to serve as a rinse between the fluoride bath and a final water rinse.

Referring now to FIGS. 8 and 9, the method includes forming at least one groove in the outer surface 112 of the substrate 110. For certain process configurations, the groove(s) 132 is (are) formed in the outer surface 112 of the substrate 110 while the respective interior space is empty. That is, for these processes, the grooves are formed without the use of a core (either a casting core or a subsequently formed core) as a backstop. However, for other process configurations, the groove(s) 132 is (are) formed in the outer surface 112 of the substrate 110 while the core 180 (either a casting core or a subsequently formed core) is disposed within the respective interior space 114. For this latter process, the core further serves as a backstop during formation of the grooves.

The grooves 132 may have any of a number of different shapes. For the exemplary configurations shown in FIGS. 8 and 9, each groove 132 narrows at the respective top 146 thereof, such that each groove 132 comprises a re-entrant shaped groove 132. Re-entrant-shaped grooves are discussed in commonly assigned, U.S. patent application Ser. No. 12/943,624, R. Bunker et al., "Components with re-entrant shaped cooling channels and methods of manufacture," which is incorporated herein in its entirety. For particular configurations, the base 134 of a re-entrant shaped groove 132 is at least 2 times wider than the top 136 of the respective groove 132. For example, if the base 134 of the groove 132 is 0.75 millimeters, the top 136 would be less than 0.375 millimeters in width, for this configuration. For more particular configurations, the base 134 of the re-entrant shaped groove 132 is at least 3 times wider than the top 136 of the respective groove 132, and still more particularly, the base 134 of the re-entrant shaped groove 132 is in a range of about 3-4 times wider than the top 136 of the respective groove 132. Beneficially, a large base to top ratio increases the overall cooling volume for the micro-channel 130, while facilitating the deposition of the coating 150 over the groove 132 (without the use of a sacrificial filler) without having the coating 150 fill the groove 132.

For the example configuration shown in FIG. 12, the groove 132 is rectangular in cross-section. Although the grooves are shown as having straight walls, the grooves 132 can have any wall configuration, for example, they may be straight or curved walls.

The grooves 132 may be formed using a variety of techniques. Example techniques for forming the groove(s) 132 include abrasive liquid jet, plunge electrochemical machining (ECM), electric discharge machining (EDM) with a spinning electrode (milling EDM), and laser machining. Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent Application Ser. No. 12/790,675, "Articles which include chevron film cooling holes, arid related processes," filed May 28, 2010, which is incorporated by reference herein in its entirety.

For particular processes, the grooves are formed using an abrasive liquid jet (ALJ) 160 (FIGS. 10-12) while a core 180 (either a casting core or a subsequently formed core) is disposed within the respective interior space 114. For other processes, the grooves are formed using an ALJ while the respective interior spaces are empty. Example water jet drilling processes and systems are disclosed in commonly assigned U.S. patent application Ser. No. 12/790,675, "Articles which include chevron film cooling holes, and related processes," filed May 28, 2010, which is incorporated by reference herein in its entirety. As explained in U.S. patent application Ser. No. 12/790,675, the abrasive liquid jet process typically utilizes a high-velocity stream of abrasive particles (e.g., abrasive "grit"), suspended in a stream of high pressure liquid, for example water. The pressure of the liquid may vary considerably, but is often in the range of about 35-620 MPa. A number of abrasive materials can be used, such as garnet, aluminum oxide, silicon carbide, and glass beads. It should be noted that the abrasive liquid jet is not 100% formed of liquid and abrasive particles, but has a large amount of air as well. In fact by volume, air is the largest constituent in a conventional abrasive water jet. Beneficially, the capability of abrasive liquid jet machining techniques facilitates the removal of material in stages to varying depths and with control over the shape of the machined features. For example, this allows the interior access holes 140 (described above with reference to FIGS. 6 and 7) that supply the channel to be drilled either as a straight hole of constant cross section, a shaped hole (e.g., elliptical), or a converging or diverging hole (not shown).

In addition, and as explained in U.S. patent application Ser. No. 12/790,675, the abrasive liquid jet system can include a multi-axis computer numerically controlled (CNC) unit (not shown). The CNC systems themselves are known in the art, and described, for example, in U.S. Patent Publication 1005/0013926 (S. Rutkowski et al), which is incorporated herein by reference. CNC systems allow movement of the cutting tool along a number of X, Y, and Z axes, as well as the tilt axes.

For particular processes, and as shown in FIGS. 10-12, each groove 132 may be formed by directing an abrasive liquid jet 160 at a lateral angle relative to the surface 112 of the substrate 110 in a first pass of the abrasive liquid jet 160 (FIG. 10) and then making a subsequent pass at an angle substantially opposite to that of the lateral angle (FIG. 11), such that each groove narrows at the opening 136 of the groove and thus comprises a re-entrant shaped groove (as discussed above with reference to FIGS. 8 and 9). Typically, multiple passes will be performed to achieve the desired depth and width for the groove. This technique is described in commonly assigned, U.S. patent application Ser. No. 12/943,624, Bunker et al., "Components with re-entrant shaped cooling channels and methods of manufacture," which is incorporated by reference herein in its entirety. In addition, the step of forming the re-entrant shaped grooves 132 may further comprise performing an additional pass where the abrasive liquid jet is directed toward the base 134 of the groove 132 at one or more angles between the lateral angle and a substantially opposite angle, such that material is removed from the base 134 of the groove 132. More generally, the re-entrant shaped grooves 132 may be formed using one or more of an abrasive liquid jet, plunge electrochemical machining (ECM), electric discharge machining (EDM) with a spinning electrode (milling EDM) and laser machining.

Referring now to FIGS. 8 and 9, the method further includes disposing a coating 150 over at least a portion of the outer surface 112 of the substrate 110. As indicated, for example in FIGS. 8 and 9, the coating 150 comprises at least a structural coating 54. Coating 150 comprises a suitable material and is bonded to the component. For the example arrangement shown in FIG. 8, the structural coating 54 extends over the groove(s) 132, such that the groove(s) 132 and the structural coating 54 together define one or more channels 130 configured to convey a coolant from the respective interior space(s) for cooling the component 100.

For particular configurations, the coating 150 has a thickness in the range of 0.1-2.0 millimeters, and more particularly, in the range of 0.2 to 1 millimeters, and still more particularly 0.2 to 0.5 millimeters for industrial components. For aviation components, this range is typically 0.1 to 0.25 millimeters. However, other thickness may be utilized depending on the requirements for a particular component 100.

The coating 150 comprises structural coating layers and may further include optional additional coating layer(s). The coating layer(s) may be deposited using a variety of techniques. For particular processes, the structural coating layer(s) are deposited by performing ion plasma deposition (also known in the art as cathodic arc deposition). Example ion plasma deposition apparatus and method are provided in commonly assigned, US Published Patent Application No. 10080138529, Weaver et al, "Method and apparatus for cathodic arc ion plasma deposition," which is incorporated by reference herein in its entirety. Briefly, ion plasma deposition comprises placing a consumable cathode having a composition to produce the desired coating material within a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail above with reference to U.S. Pat. No. 5,626,462, Jackson et al., "Double-wall airfoil." For certain hot gas path components 100, the structural coating comprises a nickel-based or cobalt-based alloy, and more particularly comprises a superalloy or a (Ni,Co)CrAlY alloy. Where the substrate material is a Ni-base superalloy containing both γ and γ' phases, structural coating may comprise similar compositions of materials, as discussed in greater detail above with reference to U.S. Pat. No. 5,626,462. Additionally, for superalloys the structural coating 54 may comprise compositions based on the γ'-Ni$_3$Al family of alloys.

More generally, the structural coating composition will be dictated by the composition of the underlying substrate. For example, for CMC substrates, such as a silicon carbide (SiC) matrix reinforced with SiC fibers, the structural coating will typically include silicon.

For other process configurations, a structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is deposited by HVOF or HVAF. Other example techniques for depositing the structural coating include, without limitation, sputtering, electron beam physical vapor deposition, entrapment plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

For certain configurations, the structural coating 54 completely bridges the respective grooves 132, such that the coating 150 seals the respective micro-channels 130. For other configurations, however, the structural coating 54 defines one or more permeable slots 144 (for example, porosity in the coating or a gap in the coating), such that the structural coating does not completely bridge each of the one or more grooves 132, as indicated in FIG. 9. Although FIG. 9 schematically depicts the slots 144 as having a uniform and straight geometry, typically each slot 144 has an irregular geometry, with the width of the slot 144 varying, as the coating 150 is applied and builds up a thickness. Initially, as the first part of the coating 150 is applied to the substrate 110, the width of the slot 144 may be as much as 50% of the width of the top 136 of the micro-channel 130. The slot 144 may then narrow down to 5% or less of the width of the top 136, as the coating 150 is built up. For particular examples, the width of slot 144, at its narrowest point, is 5% to 20% of the width of the respective micro-channel top 136. In addition, the slot 144 may be porous, in which case the "porous" slot 144 may have some connections, that is some spots or localities that have zero gap. Beneficially, the slots 144 provide stress relief for the coating 150.

There are a number of possible arrangements for the cooling channels 130, and the invention is not limited to any specific channel location. Various cooling channel configurations are described in commonly assigned, U.S. patent application Ser. No. 13/448,469, Ronald S. Bunker, "Components with microchannel cooling", which is incorporated herein in its entirety. For the example configuration shown in FIG. 6, at least one groove 132 extends at least partially along the pressure or suction side walls 24, 26 in a vicinity of the trailing edge 30 of the component 100, such that the channel 130 defined by the groove 132 and the structural coating 54 is configured to convey the coolant from the respective interior space(s) to cool the trailing edge 30 of the component 100.

Referring now to FIGS. 4 and 5, the method may further include the step of disposing the core 180 (either a casting core or a subsequently formed core) within the respective interior space 114 prior to forming the access hole(s) 140 in the substrate 110 (and optionally, prior to forming the grooves 132 in the outer surface 112 of the substrate 110) by performing the following process. First, the interior space(s) 114 is (are) at least partially filled with a slurry 182. For particular processes, the slurry 182 is a ceramic slurry 182, such that the core 180 comprises a ceramic core 180. Next, the slurry 182 is at least partially cured to form the core (180). In this manner, the core(s) is (are) disposed within the respective interior space(s) 114 prior to forming access hole(s) 140 (and optionally, prior to forming the groove(s) 132).

More particularly, the method includes the step of casting the substrate 110 after performing the filling and curing steps, such that the core 180 comprises the casting core 180. For particular processes, the interior space(s) 114 is (are) completely filled with the slurry 182.

However, for other process configurations, the casting core 180 may be removed after casting, and a new, subsequently formed core (also labeled 180) may be formed within the interior space(s) using the filling and curing process described above, to serve as a backstop during formation of the access hole(s) (and optionally during formation of the groove(s)). The interior space(s) 114 may be partially filled with the slurry 182, such that the subsequently formed core 180 only partially fills the least one interior space 114. However, for other process configurations, the subsequently formed core 180 completely fills the respective interior space 114. In addition and as noted above, the subsequently formed core need not have the same chemistry or properties (density, hardness) as the original casting core.

Beneficially, removal of the casting core and use of a subsequently deposited core as a back stop may present less logistical challenges relative to the use of the casting core as the backstop, in that the present core removal process need not be interrupted. In addition, this process would facilitate the use of partial fills. Also, more advantageous core materials may be employed. Because a subsequently formed core need not survive a casting process, lower temperature materials can be employed. For example, a cement slurry or more easily removed low-temperature core material, such as the adhesive and tooling compound marked under the name Duralco™4540, may be used.

As noted above, one aspect of the present technique uses the casting core 180 as a backstop during formation of the access hole(s) 140 and optionally during formation of the groove(s) 132. This method of forming cooling channels 130 in a component 100 is described with reference to FIGS. 2, 4, and 6-9. As indicated, for example, in FIG. 4, the method includes casting a substrate 110 around at least one casting core 180. The substrate 110 is described above with reference to FIG. 2. As indicated in FIG. 4, each casting core 180 is disposed within each interior space 114. Casting cores 180 are described above with reference to FIGS. 4 and 5.

Referring now to FIG. 6, the method further includes forming at least one access hole 140 in the substrate 110, while the casting core 180 is disposed within the respective interior space 114, where each access hole 140 connects the groove 132 in fluid communication with the respective interior space 114. The method further includes removing the casting core 180 from the respective interior space 114. As noted above, for particular process configurations, the casting core 180 comprises a ceramic casting core 180, and the ceramic casting core 180 is removed using a leaching process.

As explained above with reference to FIGS. 6 and 7, the use of the casting core when forming the access hole(s) prevents back-strike. In addition, this improved process takes advantage of the current processing of ceramic cores by simply leaving the core in the metal component as the backstop material to absorb and disperse the energy of the ALJ after it has penetrated the first wall. As noted above, this improved process has several advantages over prior art techniques. For particular processes, the casting core 180 will be at least partially cracked as a result of the formation of the access hole(s) 140 in the substrate 110. Thus for these particular processes, the ALJ will serve to partially or completely break up the casting core material making it easier to leach out, especially in regions such as the trailing edge where leaching typically takes a very long time due to the restricted dimensions.

As discussed above with reference to FIGS. 8 and 9, the method further includes forming at least one groove in the outer surface 112 of the substrate 110. Example machining techniques for forming the grooves are provided above. As discussed above, the groove(s) may have a number of different geometries and may be formed at a number of locations on the component. For particular configurations, the grooves 132 (and hence the channels 130) are re-entrant shaped, as described above with reference to FIGS. 8 and 9. For particular process configurations, the re-entrant shaped grooves 132 are formed by directing an abrasive liquid jet 160 at the surface 112 of the substrate 110 while the casting core 180 is disposed within the respective interior space 114.

More generally, for particular process configurations, the groove(s) is (are) formed in the outer surface 112 of the substrate 110 while the respective inferior space is empty. That is, for these processes, the casting core is removed after the access holes are formed and before the grooves are formed. However, for other process configurations, the groove(s) is (are) formed in the outer surface 112 of the substrate 110 while the casting core 180 is disposed within the respective interior space 114 and then the casting core is subsequently removed from the respective interior space.

Referring now to FIGS. 8 and 9, the method further includes disposing a coating 150 over at least a portion of the outer surface 112 of the substrate 110. As indicated, for example in FIGS. 8 and 9, the coating 150 comprises at least a structural coating 54. For the example arrangement shown in FIG. 8, the structural coating 54 extends over the groove(s) 132, such that the groove(s) 132 and the structural coating 54 together define one or more channels 130 configured to convey a coolant from the respective inferior space(s) for cooling the component 100. Suitable materials and deposition techniques for costing 150, including structural coating 54, are provided above.

In addition to the above described processes, for certain applications, it is desirable to remove the casting core 180 before forming the access hole(s) 140 and then form and use a subsequently formed core (which is also indicated by reference numeral 180) as a back stop during formation of the access hole(s) and optionally during formation of the groove(s). This method of forming cooling channels 130 in a component 100 is described with reference to FIGS. 2-12. As indicated, for example, in FIG. 4, the method includes casting a substrate 110 using at least one casting core 180, and removing the casting core(s) 180 from the respective interior space(s) 114. The substrate 110 is described above with reference to FIG. 2, and the casting core 180 is described above with reference to FIGS. 4 and 5.

Referring now to FIG. 4, the method further includes at least partially filling the interior space(s) 114 with a slurry 182 and at least partially curing the slurry 182 to form a subsequently formed core (which is also indicated by reference numeral 180). Techniques and materials for forming the subsequently formed core(s) 180 are provided above. For particular processes. the slurry 182 comprises a ceramic slurry 182, such that the subsequently formed core 180 comprises a subsequently formed ceramic core 180, and where the subsequently formed ceramic core 180 is removed using a leaching process. For certain process configurations, the interior space(s) 114 is (are) completely filled with the slurry 182. However, for other process configurations, the interior space(s) 114 is (are) partially filled with the slurry 182, such that the subsequently formed core 180 partially fills the interior space(s) 114.

As indicated in FIG. 7, for example, the method further includes forming at least one access hole 140 in the substrate 110, while the subsequently formed core 180 is disposed within the respective interior space 114 and removing the subsequently formed core 180 from the respective, interior space (114). Access holes and techniques for forming the access holes are described above, with reference to FIGS. 6 and 10-12. Similar to the methods described above, the use of the newly formed core when forming the access hole(s) prevents back-strike.

Under certain circumstances, use of a subsequently formed core may have certain advantages. For example, this may have logistical advantages of not interrupting the present core removal process. In addition, this process would allow a partial fill with a more advantageous material. Because a subsequently formed core need not survive a casting process, lower temperature materials can be employed. For example, a cement slurry or more easily removed low-temperature core material, such as the adhesive and tooling compound marked under the name Duralco™4540, may be used.

As discussed above with reference to FIGS. 8 and 9, the method further includes forming at least one groove in the outer surface 112 of the substrate 110. Example machining techniques for forming the grooves are provided above. As discussed above, the groove(s) may have a number of different geometries and may be formed at a number of locations on the component. For particular process configurations, re-entrant shaped grooves 132 are formed by directing an abrasive liquid jet 160 at the surface 112 of the substrate 110 while the subsequently formed core 180 is disposed within the respective interior space 114, prior to the removal of the subsequently formed core 180.

More generally, for particular process configurations, the groove(s) is (are) formed in the outer surface 112 of the substrate 110 while the respective interior space is empty. That is, for these processes, the subsequently formed core is removed after the access holes are formed and before the grooves are formed. However, for other process configurations, the groove(s) is (are) formed in the outer surface 112 of the substrate 110 while the subsequently formed core 180 is disposed within the respective interior space 114 and afterwards, the subsequently formed core is removed from the respective interior space.

Referring now to FIGS. 8 and 9, the method further includes disposing a coating 150 over at least a portion of the outer surface 112 of the substrate 110. As discussed above with reference to FIGS. 8 and 9, the coating 150 comprises at least a structural coating 54, where the structural coating 54 extends over the groove(s) 132, such that the groove(s) 132 and the structural coating 54 together define one or more channels 130 configured to convey a coolant from the respective interior space(s) for cooling the component 100. Suitable materials and deposition techniques for coating 150, including structural coating 54, are provided above.

Beneficially, in the above described processes, the core (either the casting core or a subsequently formed core) acts to absorb and disperse the abrasive liquid jet (ALJ) energy to prevent damage to the opposing interior wall. In this way, the above described processes can take advantage of the current use of casting cores by simply leaving the core in the metal component as the backstop material to absorb and disperse the energy of the ALJ after it has penetrated the first wall. Thus, these processes have several advantages. First, the ALJ will serve to partially or completely break up the core material making it easier to leach out, especially in regions such as the trailing edge where leaching typically takes a very long time due to the restricted dimensions. Further, the ceramic core is a solid material made of fine particles that can spread the ALJ energy better than larger particles. In addition, the core is already present from the casting operation, so no additional backstop material need be provided.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming cooling channels in a component comprising a substrate having an outer surface and an inner surface, wherein the inner surface defines at least one interior space, the method comprising:
   casting the substrate around a casting core;
   removing the casting core from the respective interior space;
   disposing a subsequently formed core within the respective interior space by at least partially filling the at least one interior space with a cement slurry and at least partially curing the cement slurry to form the subsequently formed core;
   forming at least one access hole in the substrate, while the subsequently formed core is disposed within the respective interior space;

at least partially cracking the subsequently formed core as a result of the formation of the at least one access hole in the substrate;

removing the subsequently formed core from the respective interior space;

forming at least one groove in the outer surface of the substrate, wherein each access hole connects the groove in fluid communication with the respective interior space; and disposing a coating over at least a portion of the outer surface of the substrate, wherein the coating comprises at least a structural coating, wherein the structural coating extends over the one or more grooves, such that the one or more grooves and the structural coating together define one or more channels configured to convey a coolant from the respective interior space(s) for cooling the component.

2. The method of claim 1, wherein the casting core comprises a ceramic core.

3. The method of claim 2, wherein the casting core is removed using a leaching process.

4. The method of claim 1, wherein each groove is formed by directing an abrasive liquid jet at the surface of the substrate.

5. The method of claim 4, wherein each groove has an opening, and wherein each groove narrows at the opening of the groove and thus comprises a re-entrant shaped groove, such that each cooling channel comprises a re-entrant shaped cooling channel.

6. The method of claim 1, wherein at least one groove extends at least partially along the pressure or suction side walls in a vicinity of the trailing edge of the component, such that the channel defined by the groove and the structural coating is configured to convey the coolant from the respective interior space(s) to cool the trailing edge of the component.

7. The method of claim 1, wherein each groove is formed in the outer surface of the substrate while the respective interior space is empty.

8. The method of claim 1, wherein the at least one interior space is completely filled with the cement slurry, such that the subsequently formed core completely fills the least one interior space.

9. A method of forming cooling channels in a component, the method comprising:

casting a substrate around at least one casting core, the substrate having an outer surface and an inner surface, wherein the inner surface defines at least one interior space, and wherein each casting core is disposed within each interior space;

removing the casting core(s) from the respective interior space(s);

disposing at least one non-casting core within the at least one interior space by at least partially filling each of the respective interior space(s) with a cement slurry and at least partially curing the cement slurry to form the non-casting core(s) within each interior space;

forming at least one access hole in the substrate, while the non-casting core is disposed within the respective interior space;

at least partially cracking the non-casting core as a result of the formation of the at least one access hole in the substrate;

removing the non-casting core from the respective interior space;

forming at least one groove in the outer surface of the substrate, wherein each access hole connects the groove in fluid communication with the respective interior space; and disposing a coating over at least a portion of the outer surface of the substrate, wherein the coating comprises at least a structural coating, wherein the structural coating extends over the one or more grooves, such that the one or more grooves and the structural coating together define one or more channels configured to convey a coolant from the respective interior space(s) for cooling the component.

10. The method of claim 9, wherein the casting core comprises a ceramic casting core, and wherein the ceramic casting core is removed using a leaching process.

11. The method of claim 9, wherein each groove is formed by directing an abrasive liquid jet at the surface of the.

12. The method of claim 11, wherein each groove has an opening, and wherein each groove narrows at the opening of the groove and thus comprises a re-entrant shaped groove, such that each cooling channel comprises a re-entrant shaped cooling channel.

13. The method of claim 9, wherein each groove is formed in the outer surface of the substrate while the respective interior space is empty.

14. A method of forming cooling channels in a component, the method comprising:

casting a substrate using at least one casting core, the substrate having an outer surface and an inner surface, wherein the inner surface defines at least one interior space;

removing the casting core(s) from the respective interior space(s);

at least partially filling the at least one interior space with a cement slurry;

at least partially curing the cement slurry to form a subsequently formed core;

forming at least one access hole in the substrate, while the subsequently formed core is disposed within the respective interior space, wherein each access hole connects the groove in fluid communication with the respective interior space;

at least partially cracking the subsequently formed core as a result of the formation of the at least one access hole in the substrate;

removing the subsequently formed core from the respective interior space;

forming at least one groove in the outer surface of the substrate, wherein each access hole connects the groove in fluid communication with the respective interior space; and disposing a coating over at least a portion of the outer surface of the substrate, wherein the coating comprises at least a structural coating, wherein the structural coating extends over the one or more grooves, such that the one or more grooves and the structural coating together define one or more channels configured to convey a coolant from the respective interior space(s) for cooling the component.

15. The method of claim 14, wherein the at least one interior space is completely filled with the cement slurry, such that the subsequently formed core completely fills the least one interior space.

16. The method of claim 14, wherein the at least one interior space is partially filled with the cement slurry, such that the subsequently formed core partially fills the least one interior space.

17. The method of claim 14, wherein each groove is formed by directing an abrasive liquid jet at the surface of the substrate while the subsequently formed core is disposed within the respective interior space.

18. The method of claim 17, wherein each groove has an opening, and wherein each groove narrows at the opening of the groove and thus comprises a re-entrant shaped groove, such that each cooling channel comprises a re-entrant shaped cooling channel.

19. The method of claim 14, wherein each groove is formed in the outer surface of the substrate while the respective interior space is empty.

20. The method of claim 14, wherein the subsequently formed core comprises a subsequently formed cement core, and wherein the subsequently formed cement core is removed using a leaching process.

* * * * *

UNITED STATES PATENT AND TRADEMARK OFFICE
CERTIFICATE OF CORRECTION

| | | |
|---|---|---|
| PATENT NO. | : 9,242,294 B2 | Page 1 of 1 |
| APPLICATION NO. | : 13/628204 | |
| DATED | : January 26, 2016 | |
| INVENTOR(S) | : Bonini et al. | |

It is certified that error appears in the above-identified patent and that said Letters Patent is hereby corrected as shown below:

Specification

In Column 7, Line 27, delete "3%" and insert -- 37% --, therefor.

In Column 13, Line 9, delete "costing 150," and insert -- coating 150, --, therefor.

Claims

In Column 16, Line 17, in Claim 11, delete "of the." and insert -- of the substrate. --, therefor.

Signed and Sealed this
Twenty-sixth Day of April, 2016

Michelle K. Lee
*Director of the United States Patent and Trademark Office*